United States Patent [19]
Alm et al.

[11] 3,749,376
[45] July 31, 1973

[54] VAPOR INJECTOR FOR ENGINES

[75] Inventors: Gerald F. Alm; Donald S. Alm; Ralph R. Harvey; Robert L. Harvey, all of Grangeville; Ray L. Andrews, Kooskia, all of Idaho; Keith B. Lewis, Everett, Wash.

[73] Assignee: Vic Chemicals, Inc., Grangeville, Idaho

[22] Filed: June 12, 1970

[21] Appl. No.: 45,635

[52] U.S. Cl............. 261/18 A, 123/1 A, 123/25 E, 123/134, 123/198 A, 261/122
[51] Int. Cl..................................................... B01f 3/04
[58] Field of Search...................... 261/23, 123, 121, 261/124, 18 A, DIG. 19, 122; 123/119 A, 119 B, 134, 124 R, 1 A, 25 E

[56] References Cited
UNITED STATES PATENTS

| 1,301,649 | 4/1919 | Campton | 261/DIG. 49 |
|---|---|---|---|
| 1,938,497 | 12/1933 | Pogue | 261/121 A UX |
| 2,150,764 | 3/1939 | Farineau | 261/50 A X |
| 2,240,459 | 4/1941 | McDowell | 123/119 B |
| 2,716,398 | 8/1955 | McMullen | 123/119 B |
| 1,820,512 | 8/1931 | Varvel | 261/123 |
| 1,974,843 | 9/1934 | Blashfield | 261/123 |
| 2,073,887 | 3/1937 | Strancke | 261/121 R |
| 2,099,802 | 11/1937 | Ewing | 261/123 |
| 2,150,764 | 3/1939 | Farineau | 261/121 R X |
| 2,632,637 | 3/1953 | Stone | 261/18 A X |
| 2,702,694 | 2/1955 | Featherston | 261/124 X |
| 2,731,250 | 1/1956 | Yon | 261/18 A |
| 2,788,084 | 4/1957 | Holzknecht | 261/123 X |
| 2,879,756 | 3/1959 | Cornelius | 261/DIG. 19 |
| 3,081,289 | 3/1963 | Cheny et al. | 261/124 |
| 3,450,116 | 6/1969 | Knight et al. | 123/119 A |
| 3,473,521 | 10/1969 | Mustain et al. | 123/119 B |
| 3,537,434 | 11/1970 | Herpin | 123/134 |
| 3,590,793 | 7/1971 | Masaki | 123/124 R X |

*Primary Examiner*—Frank W. Lutter
*Attorney*—Clarence A. O'Brien and Harvey B. Jacobson

[57] ABSTRACT

A supplemental charge forming apparatus for use with a naturally aspirated internal combustion engine provided with conventional charge forming structure. The supplemental charge forming apparatus is operable to admit additional amounts of air and vaporized fuel mixture into the intake passages of the associated internal combustion engine in amounts increasing proportional to decreases in engine manifold vacuum.

5 Claims, 9 Drawing Figures

PATENTED JUL 31 1973
3,749,376
SHEET 1 OF 2
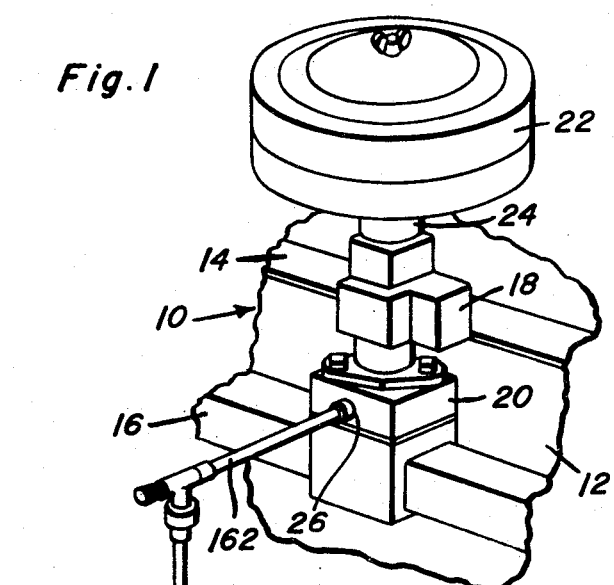
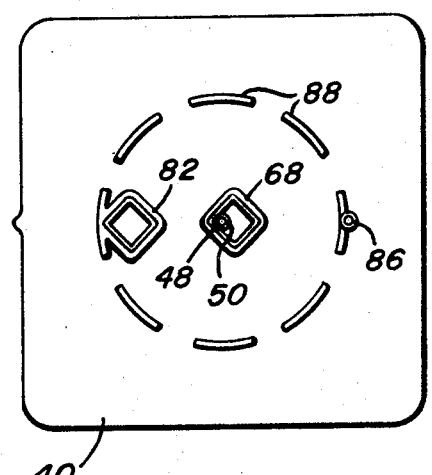
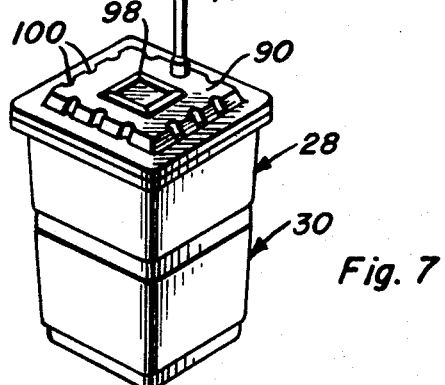
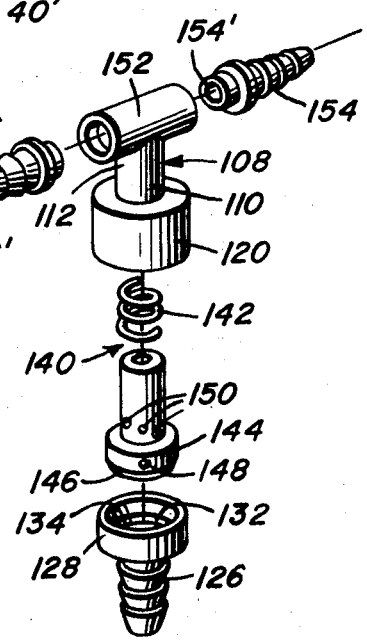
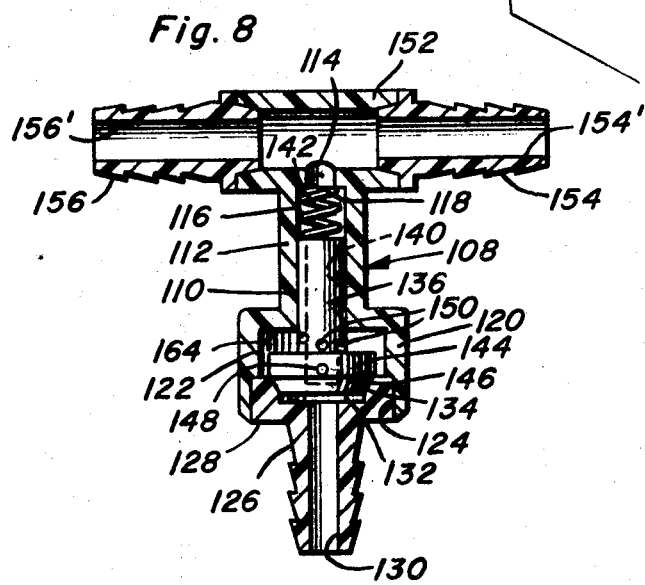
Gerald F. Alm
Donald S. Alm
Ralph R. Harvey
Robert L. Harvey
Ray L. Andrews
Keith B. Lewis
INVENTORS
BY Clarence A. O'Brien
and Harvey B. Jacobson
Attorneys

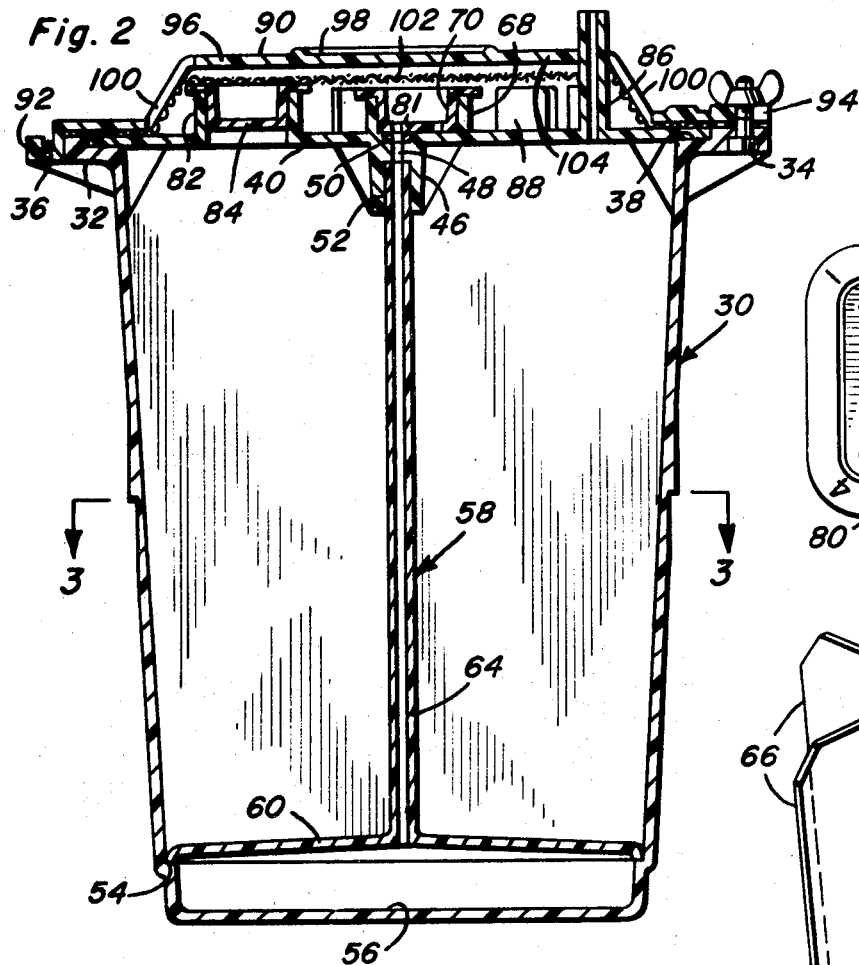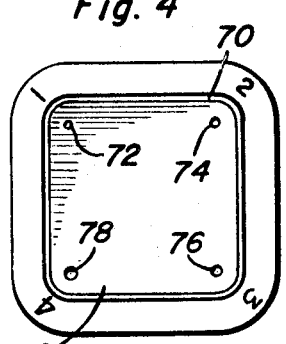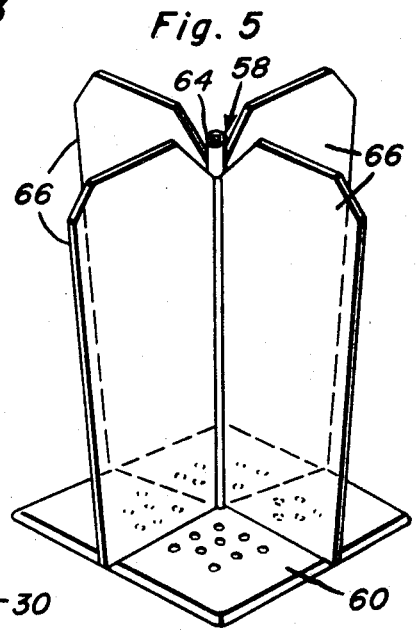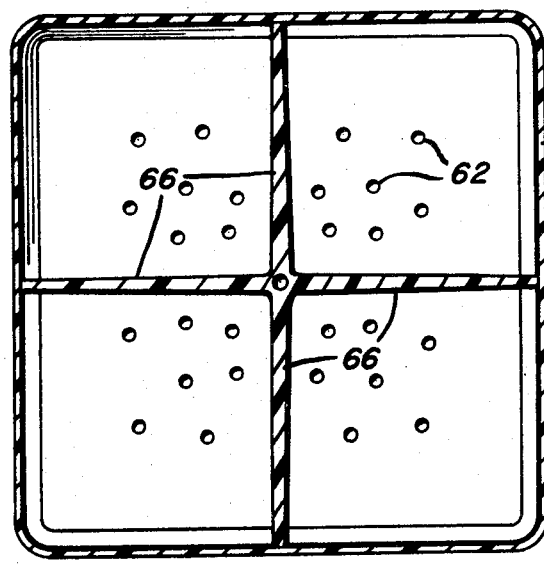

VAPOR INJECTOR FOR ENGINES

The charge forming apparatus of the instant invention has been designed to provide supplemental amounts of vaporized fuel and air for burning in an internal combustion engine in order to promote more efficient and complete burning of air and fuel within the engine. More complete burning of the air and fuel mixture provided to the combustion chambers of the combustion engine in turn results in reductions in unburned hydrocarbons in the engine exhaust and also reductions in the amount of carbon monoxide in the engine exhaust.

More complete burning of the air and vaporized fuel mixture supplied to the combustion chambers of a combustion engine not only results in cleaner exhaust but also greater power, increased economy and longer engine life. Longer engine life results from many areas including reduced fuel dilution of engine lubricating oils, less formation of carbon deposits and reduced sludge formation. Accordingly, a relatively inexpensive means of promoting more complete combustion within the combustion chambers of an engine can result in savings which far out weigh the initial cost of such a combustion improving attachment.

It is accordingly the main object of this invention to provide an attachment that may be readily utilized in conjunction with naturally aspirated internal combustion engines for the purpose of promoting more efficient combustion within the combustion chambers of that engine.

Another important object of this invention is to provide an attachment in accordance with the preceding object and constructed in a manner whereby relatively humid air containing liquid fuel vapors may be produced in an efficient manner for discharging into the intake manifold of an associated combustion engine in amounts increasing proportional to decreases in engine vacuum.

Another important object of this invention is to provide an attachment including a control valve therefor constructed in a manner whereby it will be maintained substantially free from contamination by dirt from ambient atmosphere.

Still another object of this invention is to provide a charge forming apparatus in accordance with the immediately preceding object designed to utilize a mixture of air and methanol alcohol whereby the valve structure of the attachment will be continuously cleansed by the air and alcohol vapors passing therethrough.

A final object of this invention to be specifically enumerated herein is to provide a vapor injector for engines in accordance with the preceding objects and which will conform to conventional forms of manufacture, be of simple construction and automatic in operation so as to provide a device that will be economically feasible, long lasting and relatively trouble-free.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a fragmentary schematic view in perspective of a conventional form of internal combustion engine with the vapor injector of the instant invention operatively associated therewith;

FIG. 2 is an enlarged fragmentary vertical sectional view of the reservoir portion of the vapor injector taken substantially upon a plane passing through the center of the reservoir;

FIG. 3 is a horizontal sectional view taken substantially upon the plane indicated by section line 3—3 of FIG. 2;

FIG. 4 is a top plan view of a primary inlet air metering valve assembly which is removably supported from the inner top of the reservoir of the injector;

FIG. 5 is a perspective view of the internal air inlet and diffusing assembly for the injector and illustrating its baffle structure;

FIG. 6 is a top plan view of the inner top of the reservoir;

FIG. 7 is an exploded perspective view of the vacuum actuated control valve of the injector;

FIG. 8 is an enlarged vertical sectional view of the control valve taken substantially upon a plane passing through the center thereof; and FIG. 9 is an enlarged fragmentary sectional view of one peripheral portion of the inner top of the reservoir illustrating the collapsible labyrinth seals thereof.

Referring now more specifically to the drawings, the numeral 10 generally designates a conventional form of internal combustion engine including a block 12, a cylinder head 14, an intake manifold 16 and a carburetor 18 mounted on the inlet flange of the intake manifold 16 with a spacer block 20 interposed between the mounting flanges of the manifold 16 and carburetor 18.

It is to be noted that the internal combustion engine and its air and fuel induction system are conventional in design and that the combustion engine 10 is naturally aspirated through the carburetor 18 which has an air cleaner 22 mounted on its inlet horn 24.

The spacer block 20, or at least a corresponding component, is found on many internal combustion engines and is provided in order to heat insulate the carburetor 18 from the manifold 16 which is subject to exhaust heat, as is conventional. However, in this instance the spacer block 20 has a horizontal transverse bore 26 formed therein whose inner end opens into the passage (not shown) extending through the spacer block 20 and aligned with the outlet and inlet ends, respectively, of the passages formed in the carburetor 18 and manifold 16. Accordingly, the transverse bore 26 is subject to manifold vacuum.

The vapor injector of the instant invention is generally referred to by the reference numeral 28 and includes an open top reservoir referred to in general by the reference numeral 30. The upper end of the reservoir 30 includes a peripherally extending mounting flange 32 and one portion of the mounting flange 32 is provided with a hold-down fastener 34 while an opposite marginal portion of the mounting flange 32 is provided with a hinge pin 36.

The mounting flange 32 is relieved as at 38 about its inner peripheral portion and an inner top wall 40 is seated in the relieved area 38 and includes double inner and outer peripherally extending and depending flexible seal portions 42 and 44 which are deflected and compressed as the top wall 40 is drawn down tightly into engagement with the upper surface of the relieved area 38. The seal portions 42 and 44 define a labyrinth seal closing the upper end of the reservoir 30 in a fluid-tight manner.

The top wall 40 includes a central depending boss 46 defining a vertical bore 48 therethrough which includes an upper counterbore 50 and a lower counterbore 52.

The reservoir 30 includes a peripheral inwardly projecting and upwardly facing shoulder 54 a spaced distance above its bottom wall 56 and an air inlet and deflector assembly referred to in general by the reference numeral 58 is provided and includes a lower deflector plate 60 which is seated tightly upon the shoulder 54 and has a plurality of vertical apertures 62 formed therethrough. In addition, the assembly 58 includes an upstanding air inlet tube 64 whose lower end is supported from and opens downwardly through the center of the plate 60 and four upstanding partitions or baffles 66 which are spaced equally about and radiate outwardly from the tube 64 and have their lower ends secured to the plate 60. The entire assembly 58 may be formed as one-piece out of any suitable material such as plastic. However, as will be noted from FIG. 2 of the drawings, when the assembly 58 is seated within the reservoir 30 with the plate 60 abutting the shoulder 54, the outer edges of the partitions or baffles 66 contact the confronting wall portions of the reservoir 30 and the upper end of the tube 64 is upwardly and snugly seated in the counterbore 52.

The top wall 40 includes an upwardly projecting neck 68 disposed about the counterbore 50 and the neck 68 is formed integrally with the top wall 40 and provided with a removable closure member 70 which is generally square in cross-sectional shape and includes four different size apertures 72, 74, 76 and 78 formed in its bottom wall 80 which may be selectively registered with the counterbore 50 in the four different rotated positions of the closure member 70 within the neck 68. The closure member 70 seats downwardly in the neck 68 against an O-ring seal 81 seated in the counterbore 50.

The top wall 40 includes a further upstanding neck 82 removably closed by means of a closure member 84 similar to the closure member 70, but devoid of metering apertures such as the apertures 72, 74, 76 and 78 and the neck 82 defines an inlet neck for fluid being poured into the eservoir 30.

From FIG. 2 of the drawings it may also be seen that the top wall 40 includes an outlet tube 86 which projects upwardly from the top wall 40 and opens downwardly through the latter. Also, a plurality of arcuate upstanding flanges 88 are disposed about the top wall 44 and enclose the area in which the necks 68 and 82 are disposed.

An outer top wall 90 is provided for the reservoir 30 and includes a hinge journal portion 92 hooked beneath the hinge pin 36 and an opposite slotted marginal portion 94 through which the fastener 34 extends when the fastener 34 is tightened so as to secure the outer top wall 90 over the inner top wall 40 as well as the upper end of the reservoir 30. The central portion of the outer top wall 90 is upwardly offset as at 96 so as to be spaced above the necks 68 and 82 and the central area of the upper surface of the top wall 90 includes a recess 98 for receiving a panel member (not shown) with identifying and/or or instructional indicia thereon.

The top wall 90 includes a plurality of peripherally spaced air inlet openings 100 and the outlet tube 86 projects upwardly through the air inlet opening 100 adjacent the fastener 34. In addition, a formed air filtering screen panel 102 has its outer peripheral portions clamped between the confronting surfaces of the inner top wall 40 and the outer top wall 90 and includes an upwardly offset central portion 104 spaced beneath the upwardly offset portion 96 but extending over the upper ends of the necks 68 an 82. Accordingly, any ambient air passing downwardly into the tube 64 will be filtered. Further, the outer periphery of the outer top wall 90 includes a single downwardly projecting and peripherally extending integral rib portion similar to the seal portions 42 and 44 defining an area within which the filter screen 102 is snugly received and thus retained.

With attention now invited more specifically to FIGS. 7 and 8 of the drawings there will be seen a valve assembly referred to in general by the reference numeral 108 and which includes a body 110 including a lower upright portion 112 through which a vertical bore 114 is formed. The bore 114 includes a lower counterbore 116 which defines a shoulder 118 about the lower end of the bore 114 in the upper portion of the body 110 and the lower end of the body 110 includes a diametrically enlarged portion 120 in hich a second counterbore is formed and there is yet a third counterbore 124 formed in the extreme lower end of the enlarged portion 120 defining the lower terminus of the body 110. An inlet nozzle 126 including a diametrically enlarged head portion 128 has its head portion seated in the counterbore 124 and the inlet nozzle 126 has a bore 130 formed therethrough including an upper end counterbore 132 whose uppermost extremities are beveled as at 134.

A piston-type valve including a cylindrical body 136 having a bore 140 formed therein is reciprocally and rotatably disposed in the first counterbore 116 and a compression spring 142 is disposed between the upper end of the cylindrical body 136 and the shoulder 118 whereby the valve element is urged downwardly in the counterbore 116. The lower end of the body includes a diametrically enlarged head 144 including a lower beveled portion 146 which mates with and seats against the beveled portion 134 of the upper end of the counterbore 132 and the head 144 includes a radial bore 148 which opens laterally into the lower closed end of the bore 140. In addition, the cylindrical body 136 includes three circumferentially and axially spaced radial bores 150 which open into the bore 140 and are exposed between the upper end of the head 144 and the upper end of the second counterbore 122 when the valve element has its head 144 seated against the beveled upper end portion of the counterbore 132.

The upper end of the body 110 includes a tubular cross-head 152 into whose central portion the upper end of the bore 114 opens and in whose opposite ends a pair of outlet necks 154 and 156 have their inlet ends secured. The outlet necks 154 and 156 have bores 154' and 156' formed therethrough whose inlet ends open into the corresponding opposite ends of the tubular cross-head 152 and the valve assembly 108 includes a closure cap 158 which may be removably secured over the outlet end of either of the outlet nozzles 154 and 156. From FIG. 8 of the drawings it may be seen that the bores 154' and 156' are of different diameters.

A length of flexible tubing 160 is secured between the outlet tube 86 and the inlet neck 126 and a second length of tubing 162 is connected between the bore 26 and one of the outlet necks 154 and 156 while the cap 158 is engaged over the other outlet neck so as to close the latter.

In operation, assuming that any suitable liquid mixture such as a mixture of water and methanol alcohol has been placed in the reservoir 30 and the top walls 40 and 90 have been secured in their closed positions, operation of the engine 10 at idle speeds will cause manifold vacuum to be applied to the valve member 136 so as to raise the latter upwardly in the body 110 until the head 144 abuts the shoulder 164 defined between the first counterbore 116 and the second counterbore 122. With the valve in this position, only the bore 148 is operative to communicate the tubular crosshead 152 with the inlet neck 126 and thus the passage of air and vapor which may be passed upwardly through the valve assembly 108 is limited. However, engine vacuum is applied to the interior of the reservoir 30 with the result that inlet air passed through the outer top wall 90 through the openings 100, down through one of the apertures 72, 74, 76 and 78, down through the tube 64 and outwardly beneath the plate 60 for passage upward through the aperture 62. The air will then bubble upwardly through the liquid disposed in the reservoir 30 and pass outward of the reservoir 30 through the outlet tube 86 and through the valve assembly 108 before passing into the intake manifold 16. As the air bubbles upwardly through the liquid mixture in the reservoir 30, the air picks up water and methanol alcohol vapors and these vapors are carried into the intake manifold 16 for comingling with the fuel and air mixture provided by the carburetor 18 before passing into the combustion chambers of the engine 10. This comingling of water and methanol alcohol vapors with the change formed by the carburetor 18 will result in more efficient combustion within the combustion chambers. However, should the engine 10 be operating at normal highway speeds, the engine vacuum will be reduced and the spring 142 will urge the valve 136 downwardly until at least one of the bores 150 is also positioned below the shoulder 164 thus admitting more vapors from the reservoir 30 into the manifold 16. Further, if a heavy load is placed upon the engine 10 such as when the throttle is suddenly opened, manifold vacuum will be further reduced and the spring 142 will urge the valve member 136 downwardly to a position spaced just above the position thereof illustrated in FIG. 8 of the drawings wherein all three of the bores 150 as well as the bore 148 will be exposed while the head 144 is at least slightly spaced above the seat defined by the beveled portions 134 of the counterbore 132. This of course will allow a maximum amount of vapors from the reservoir 30 to pass through the valve assembly 108 and to the intake manifold 16.

When the engine 10 is decelerating or being driven by the associated motor vehicle such as when the motor vehicle is coasting downhill, engine vacuum is increased to a point wherein the head 144 is again abutted against the shoulder 164 and the passage of vapors from the reservoir 30 through the valve assembly 108 is severely restricted. In addition, the closure member 70 may be secured within the neck 68 in different rotated position so as to selectively register the apertures 72, 74, 76 and 78 with the counterbore 50 and thus the closure member 70 may be adjusted as desired according to the liquid mixture disposed within the reservoir 30 and the engine with which the vapor injector 28 is to be used.

The outer peripheral edge portions of the lower deflector plate 60 seat tightly against the upwardly facing shoulder 54 and therefore all ambient air passing downwardly through the air inlet tube 64 and discharged beneath the deflector plate 60 must pass upwardly through the openings or apertures 62 formed in the plate 60. Therefore, the inlet air is broken up into small bubbles before it is allowed to bubble upwardly through the fluid disposed within the reservoir 30.

Also, the construction of the valve assembly 108 is such that the valve head 144 may be quickly seated against the beveled uppermost extremities 134 of the counterbore 132 if the associated engine should back fire through its intake manifold. Also, any condition under which intake manifold vacuum drops below a predetermined minimum will be accompanied by the head 144 being moved under the biasing action of the spring 142 to its closed position.

In lieu of the inner top wall 40 and closure members 70 and 84, a similar inner top wall but including generally cylindrical necks corresponding to necks 68 and 82 and including slightly downwardly beveled inner surfaces may be provided. In this instance, closure members similar to the closure members 70 and 84 but of slightly tapered cylindrical configuration will be used. Further, if the vapor injector 28 is to be utilized in conjunction with an internal combustion engine for which the injector 28 has been specifically designed, such a modified cylindrical neck utilized in lieu of the neck 68 may be concentrically positioned relative to the bore 48 and the bottom wall of the cylindrical closure member corresponding to the closure member 70 may have a single centrally disposed aperture of a predetermined size formed therethrough for registry with the counterbore 50. In such instance, the size of the opening in the modified central closure member will be predetermined to afford the desired operation of the injector 28 and the user of the modified injector need not experiment to determine which of the four apertures 72, 74, 76 and 78 should be registered with the counterbore 50.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A charge forming device including a closed reservoir, said reservoir including air intake passage means having an inlet end opening outwardly to the ambient atmosphere and a discharge end opening into the interior of said reservoir below the intended liquid level therein, said reservoir including an air and vaporized fuel outlet opening into said reservoir above said intended liquid level, a vacuum line having an inlet end connected to said outlet and an outlet end adapted to open into the intake passages of a naturally aspirated engine subject to manifold vacuum, said outlet including vacuum controlled valve means operable to variably restrict the flow of air and vaporized fuel therepast in response to increases in vacuum in said outlet at said valve, said reservoir including a lower internal horizontal baffle plate downwardly through the center of which the discharge end of said air intake passage means opens, said baffle plate including a plurality of apertures formed therethrough through which intake air may bubble upward, said air intake passage means including an upstanding tube whose lower end is secured to and opens downwardly through the center of said baffle plate, and a plurality of upstanding partitions spaced circumferentially about said tube within said reservoir and radiating generally radially outwardly of said tube and dividing the interior of said reservoir above said baffle plate into a plurality of separate upstanding compartments, said reservoir including an inner top wall removably closing the open upper ends of said compartments and through which said outlet opens into one of said compartments said top wall including an air inlet opening formed therethrough with which the upper end of said tube is registered, the upper marginal edge portions of said partitions including voids establishing communication between the upper portions of said compartments.

2. The combination of claim 1 wherein said top wall includes variable air flow restricting means operatively associated with said inlet opening operative to adjustably meter the flow of inlet air therethrough.

3. The combination of claim 2 wherein said top wall includes an inlet neck through which liquid may be poured into said reservoir, said inlet neck including a removable closure.

4. A charge forming device including a closed reservoir, said reservoir including air intake passage means having an inlet end opening outwardly to the ambient atmosphere and a discharge end opening into the interior of said reservoir below the intended liquid level therein, said reservoir including an air and vaporized fuel outlet opening into said reservoir above said intended liquid level, a vacuum line having an inlet end connected to said outlet and an outlet end adapted to open into the intake passages of a naturally aspirated engine subject to manifold vacuum, said outlet including vacuum controlled valve means operable to variably restrict the flow of air and vaporized fuel therepast in responst to increases in vacuum in said outlet at said valve, said reservoir includng a lower internal horizontal baffle plate downwardly through the center of which the discharge end of said air intake passage means opens, said baffle plate including a plurality of apertures formed therethrough through which intake air may bubble upward, said air intake passage means including an upstanding tube whose lower end is secured to and opens downwardly through the center of said baffle plate, and a plurality of upstanding partitions spaced circumferentially about said tube within said reservoir and radiating generally radially outwardly of said tube, said reservoir including an inner top wall removably closing the open upper end of said reservoir and through which said outlet opens, said top wall including an air inlet opening form therethrough with which the upper end of said tube is registered, and an outer top all disposed over and including peripheral portions abutted against corresponding peripheral portions of the first mentioned top wall, said outer top wall having air inlet openings formed therethrough, and a panel of air filtering material including peripheral portions secured between the opposing peripheral edge portions of said top walls and through which ambient air gaining access to said air inlet openings must pass.

5. In combination with a naturaly aspirated combustion engine including itake passages subject to engine vacuum, liquid vaporizing means including a liquid reservoir having a quantity of liquid disposed therein, said vaporizer means including means defining gas passage means provided with inlet and outlet ends, said inlet end being adapted for communication with a source of gas, said vaporizer means further including means operative to cause vapors of said liquid to become suspended in a flow of gas passing through said passage means from the inlet end thereof to the outlet end thereof in amounts increasing generally proportional to increases in the volume of gas flowing through said passage means, said outlet end being communicated with said intake passages, and engine vacuum responsive valve means operatively associated with said passage means for terminating the gas flow through said passage means in response to engine vacuum dropping below a predetermined minimum, allowing full flow of gas flow through said passage in response to engine vacuum increasing from below said predetermined minimum to the predetermined minimum, and gradually restricting the flow of gas through said passage to a predetermined minimum flow in response to engine vacuum increasing from said predetermined minimum vacuum to a predetermined maximum vacuum.

* * * * *